(12) United States Patent
Bazoon

(10) Patent No.: US 7,016,889 B2
(45) Date of Patent: Mar. 21, 2006

(54) SYSTEM AND METHOD FOR IDENTIFYING USEFUL CONTENT IN A KNOWLEDGE REPOSITORY

(75) Inventor: Mehdi Bazoon, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 566 days.

(21) Appl. No.: 10/355,498

(22) Filed: Jan. 30, 2003

(65) Prior Publication Data
US 2004/0153962 A1   Aug. 5, 2004

(51) Int. Cl.
*G06N 5/00* (2006.01)
(52) U.S. Cl. .......................... 706/48; 707/100; 707/200
(58) Field of Classification Search ................ 706/48; 707/100, 200
See application file for complete search history.

(56) References Cited

U.S. PATENT DOCUMENTS 5,721,911 A * 2/1998 Ha et al. .................. 707/100
6,067,549 A * 5/2000 Smalley et al. .......... 707/104.1
6,185,576 B1 * 2/2001 McIntosh .................. 707/200

OTHER PUBLICATIONS

Vigneette V6 Multisite Content Manager, Published Aug. 2002, pp. 1-4.
Utilizing the Content Management Lifecycle to Create Effective Online Relationships, Considerations and Capabilities, White Pager, May 23, 2002, v. 1.0, Published Apr. 2002, pp. 1-34.

* cited by examiner

Primary Examiner—Wilbert Starks, Jr.

(57) ABSTRACT

A system and method is provided for identifying useful content in a knowledge repository accessed by a plurality of users. The system and method includes the operation of identifying each unique user that accesses a document in the knowledge repository. Another operation is tracking an amount of time each unique user has a document open to create a set of document open time values. Document usefulness is then determined based on a comparison of the document open time values for the unique users.

24 Claims, 5 Drawing Sheets

| Document ID | Time Opened (In Seconds) |
|---|---|
| A5404915 | 2 |
| A5404915 | 2 |
| A5404915 | 1 |
| A5404915 | 1 |
| A5404915 | 1 |
| A5404915 | 2 |
| A5404915 | 4 |
| A5404915 | 490 |
| A5404915 | 10 |
| A5404915 | 62 |

SYSTEM AND METHOD FOR IDENTIFYING USEFUL CONTENT IN A KNOWLEDGE REPOSITORY

FIELD OF THE INVENTION

The present invention relates generally to content in a knowledge repository.

BACKGROUND

The Internet as a network of connected computers has existed for several decades, but more recently a graphical interface to the Internet was widely adopted in the mid-1990s. The interface uses hypertext markup language documents (HTML) as a base structure and distributes these documents using hypertext transfer protocol (HTTP). This relatively intuitive interface is now known as the World Wide Web, and it has allowed many companies and individuals to provide information to a wide audience. Extensions have also been made to this architecture, such as Java and Active Server Pages, to provide web pages that are more dynamic.

This simple and powerful medium for distributing information has been adopted by many companies or entities in order to provide information, documents, multi-media presentations, and similar resources for their clients, customers, and product users. The desire to deliver a large volume of content has resulted in the creation of knowledge repositories containing thousands of documents relating to a company's products, product support and similar information. To support content organization, management, and delivery, many vendors provide portal content and document management tools to entities that need such services. These portal and document management tools typically include software to organize and format content, publish content, create user sessions, and provide a user interface.

The use of knowledge repositories allows entities to deliver content to users in a speedy and effective fashion. For example, many companies have used knowledge repositories as a support tool for technical computer issues. If a user has a technical problem with their computer, the user can access the computer vendor's website and retrieve information from the knowledge repository to aid the user in fixing the problem. Frequently, companies are able to reduce support costs by allowing users to access such support pages. Many large companies such as Hewlett-Packard, Microsoft, IBM and others have used these tools to reduce computer support costs. Because technical support consumes a large amount of a technical company's resources, the effective delivery of relevant support content is valuable. The more quickly a user can find and use relevant content, the more satisfied the customer will be.

Usefulness of information is a subjective notion and it is difficult to determine. Individual users may not use the same criteria to evaluate whether a document is useful or answers specific user questions. Gathering information on the usefulness of online content is a challenging task for an information retrieval system or knowledge repository.

Users who desire to access documents located in a knowledge repository or web page collection typically access the pages through a corporate portal or similar website. In order to find useful documents, the users can use a search engine to query the knowledge repository.

As knowledge repositories are used more extensively, the size of the knowledge repositories and their document databases grows. This is because more documents are added to the database. A drawback to the growth of these types of databases is that users may find it more difficult to identify relevant documents that apply to their problems or needs. Search results can be diluted, especially if the user does not enter a well-focused search that brings up relatively related documents. This is because there may be a large number of other unrelated documents that are brought up by the search. Thus, it can be difficult to identify which documents are most relevant to a problem or piece of information the user desires to find.

If a document or knowledge management system can identify documents that are more relevant to users, then the system can increase the search ranking for documents found through the search engine. In order to increase search rankings for useful documents, the system tries to identify documents which are more relevant or related to common issues identified by users. Conversely, less relevant documents will be used less frequently and those documents receive a lower ranking. The less relevant documents should not generally be shown as a higher priority search result than useful documents even if they match the search criteria being provided by the user.

One of the methods knowledge management systems currently use to identify useful documents is tracking the number of times a document is opened. This helps the system know which documents are being opened the most. Tracking the number of times a document is opened assumes each time a document is opened that users are using or reading the document. On the other hand, documents that are rarely opened are considered less useful and may be reduced in priority in any search results provided to the user. One problem with this system is a user can open a document and decide that the document is not relevant. Then the user may immediately close the document but the event will still be registered in the document's hit count, thereby making the document appear more relevant.

Another direct way to capture the usefulness of a document is to ask users to provide feedback after reading a document. However, users are reluctant to provide their feedback. Typically, users do not feel they have time to provide specific feedback on documents. In addition, direct feedback information is sketchy at best because the system cannot identify the competency of individuals giving feedback and the size of the population sample is not controllable.

SUMMARY OF THE INVENTION

The invention provides a system and method for identifying useful content in a knowledge repository accessed by a plurality of users. The invention includes the operation of identifying each unique user that accesses a document in the knowledge repository. Another operation is tracking an amount of time each unique user has a document open to create a set of document open time values. Document usefulness is then determined based on a comparison of the document open time values for the unique users.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
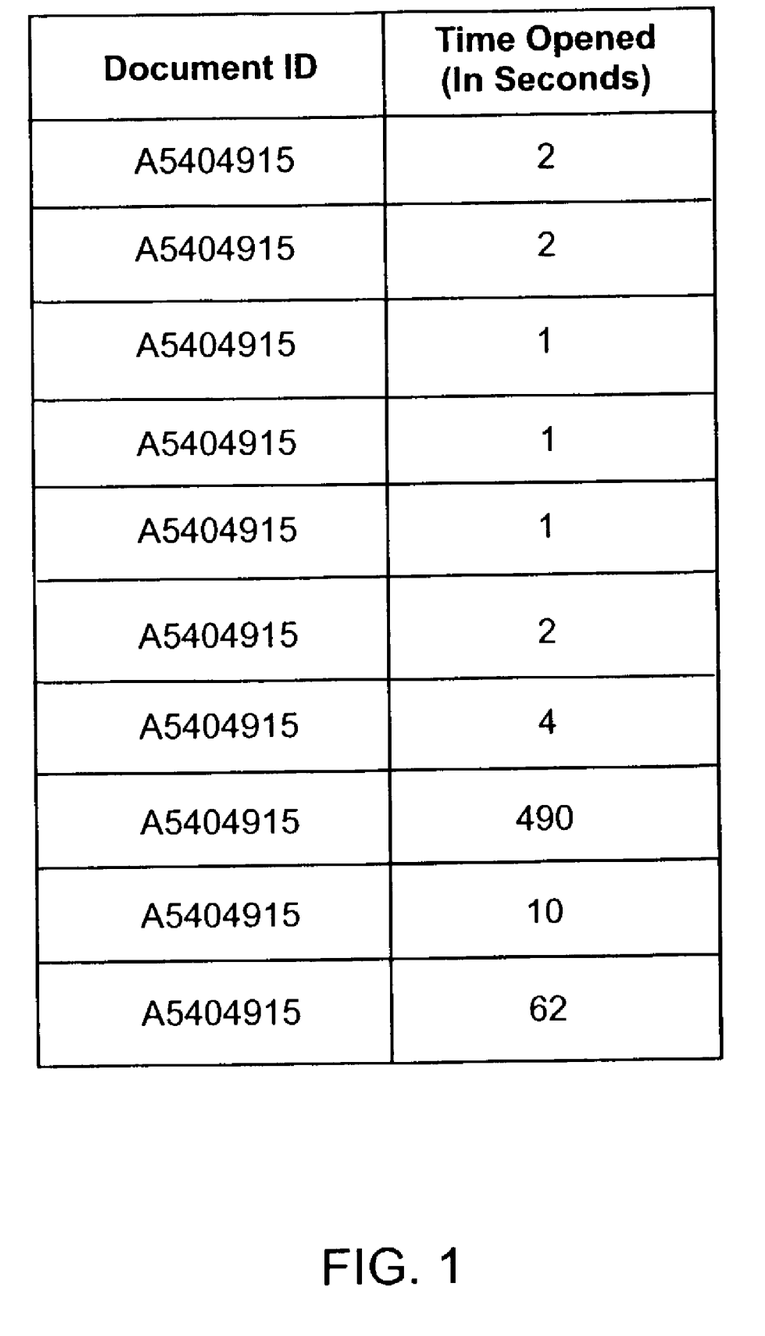
FIG. 1 is a table illustrating an example of a range of times that can be recorded when a document in a knowledge repository is opened by a user.

Even though a document is frequently opened does not necessarily mean the document contains useful information. As illustrated in FIG. 1, Document A5404915 was opened 10 times. Six times out of ten times the document was opened, it was opened for less than three seconds. By looking at the actual document, it becomes apparent that it is impossible for an individual to get any useful information from the document in less than three seconds. This probably means the document was opened by a user who immediately realized he was not interested in the document.

One or two of the document open times in FIG. 1 are rather long. One reason for this is that a user who reads a document may begin reading a document and then start another task. This is recorded in the system as a document that is open for a long time, although the document is not useful to the user. Alternatively, the user may be interrupted or leave their workplace and leave the document open. Another example is that the user may switch to another tool or document to find a solution. Each of these situations illustrate that the user is not actually using the document but the system records a very long document open time.

Actual usefulness of a document is related to relevancy but it is not relevancy. In the past, a document was considered relevant if it was opened but this is not usefulness either. Theoretically, if an expert user studied retrieved documents one-by-one for a search string query, the expert may find X number of documents to be relevant. This means the documents match the search criteria from a substantive keyword point of view. There will also be other documents that are extraneous and do not substantively match the keyword search. Then, the relevancy can be calculated as:

$$\text{Relevancy} = \frac{\text{Number of relevant documents}}{\text{Total number of retrieved documents}}$$

The present invention has recognized the distinction between relevant and useful documents. A relevant document is one that is retrieved from a search engine through a Boolean search string match. In contrast, a useful document is one that a user shows interest in and spends time reading. The present system and method helps identify whether or not a reader shows interest in a document, regardless of the document relevance to a given search string query. There is more value in finding document usefulness based on an analysis of aggregate user interactions with each document, as opposed to using the frequency with which the document was opened. This approach addresses users' actual use and reading of a document to determine a document's usefulness.

Whether a document satisfies a user's Boolean query or is frequently opened by users is not the deciding factor in determining if a document contains useful information. A document can be considered useful if the document is conceptually relevant to information that a user is seeking. More specifically, a document can be identified as useful if the document is opened by a user and a substantial portion of the document was read by the user. In addition, the time duration that a document is opened by unique users can indicate how useful the document is to users.

In order to determine the relative useful time duration for an open document, it is desirable to have a plurality of unique users open a given document. Tracking the length of time that several unique users keep a document open provides a data set to help determine what the time open values mean. Additional conditions can also be used to make the final decision about whether a document is useful and to determine the degree of document usefulness. User judgment or the receipt of user feedback can also be used in determining a document's usefulness. Unfortunately, users have not historically provided enough actual feedback regarding documents in a knowledge database. When document feedback is provided though, this feedback helps explicitly identify content value. Content value can be further determined by a field domain expert or topic expert, but this evaluation is a time consuming and relatively expensive undertaking.

Figure 2:
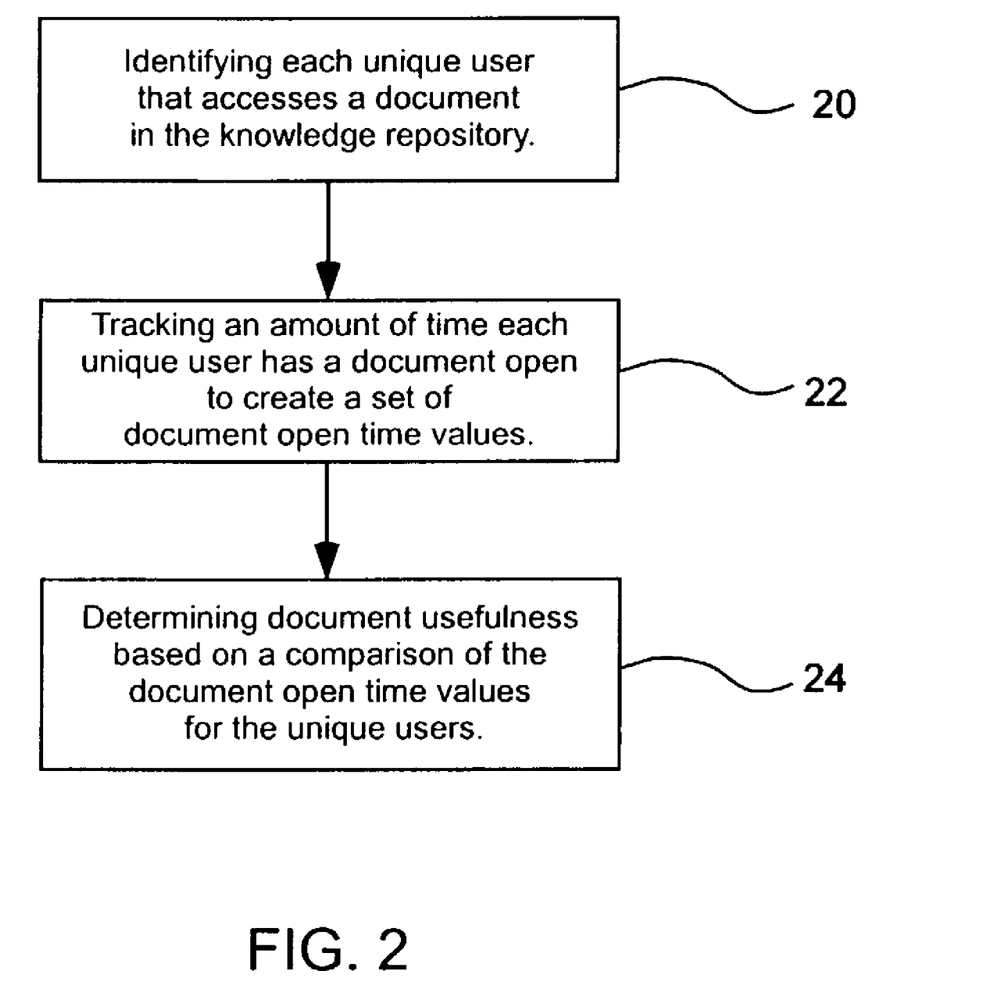
FIG. 2 is a flow chart illustrating a method for identifying useful content in a knowledge repository in accordance with an embodiment of the present invention.

FIG. 2 illustrates a method for identifying useful content in a knowledge repository. This knowledge repository can be accessed by a plurality of users. The knowledge repository can be strictly a document database or the repository can include multi-media elements, such as audio, video, digital slides, and similar presentations.

The method includes the step of identifying each unique user that accesses a document in the knowledge repository in block 20. User identification can take place using network connection software, Internet portal software or similar connection schemes. Another step is tracking the amount of time each unique user has the document open to create a set of document open time values in block 22. A system process can be provided to track the amount of time that a unique user has a document open. Document usefulness can then be determined based on a comparison of the document open time values for unique users in block 24.

As the size of the set of document values increases, the accuracy of the comparison between the time values will generally improve. Being able to compare the document open times from a large set of time values allows the system to identify outlying values that are not relevant to document usefulness. For example, some documents will be open for two or three seconds and such values are not likely to contribute to the overall usefulness value. The same is true of very large document open values, which probably indicate that a document was opened and forgotten.

Another step that can be used to determine the document usefulness is based on comparing an individual document time open value to the set of document open time values. This provides an instantaneous document usefulness. These instantaneous document usefulness values can be aggregated together to determine the entire usefulness of the document.

In addition to the basic usefulness considerations that use the document open time values and track the unique users who open a document, other variables can also be included in the calculation of usefulness. For example, the following variables can be related to each document:

Direct user feedback.

Frequency a document is opened from a search result list or another knowledge document.

Total number of unique users who have opened a document.

Document ranking in a search list.

Document type.

Document age.

Other criteria that can be used in considering the usefulness of a document are the user's rating of a document on a discrete linear scale (e.g. 1 to 10) and the actual length or complexity of a document. The present invention can also adjust the overall usefulness of a document if the document was deemed useful in a previous time period, such as previous weeks or months.

The accumulation of document usefulness data can be applied in a number of ways. One approach for applying document usefulness is in influencing the ranking of a retrieved document for a search engine. The results of a search engine query can be compared to a list of useful document IDs. When the retrieved document is on the list of useful documents, the priority of that document can be increased. This pushes the useful documents up to the top of the result list and allows users to more easily view useful and relevant documents.

Many knowledge repositories have a topic indexing system where specific documents related to topics are cross referenced. The present system can compare its list of useful document IDs against topic indexes. Each document that is qualified under a topic and is a useful document can be added to the index for that specific topic. In addition, the document can be increased or decreased in priority based on the relative usefulness of the document.

Document usefulness can even be applied based on which sections of a document were accessed. If a user accesses the abstract of the document without accessing the key portions of the document, then the system can determine that the time spent in the document was less useful. If the user opens a key portion of the document, then that document access can be considered a more useful access.

Figure 3:
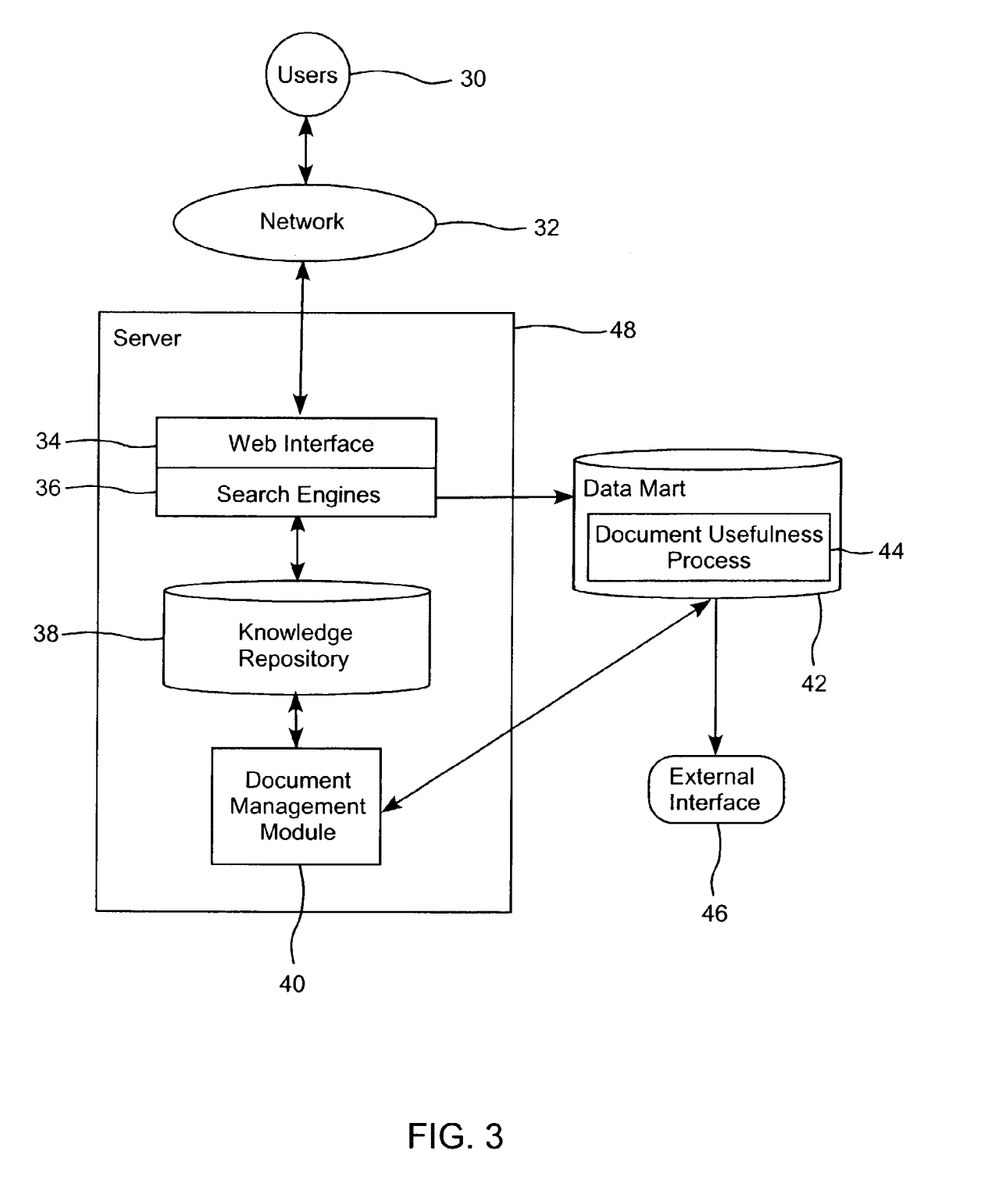
FIG. 3 is block diagram illustrating an embodiment of a system for identifying useful documents in a knowledge repository through a web interface.

FIG. 3 illustrates a system for identifying useful documents accessed by a plurality of users 30. The users are able to access the documents or multi-media elements contained on a server 48 through a network 32. The network can be a local area network, wide area network, or the Internet. A knowledge repository 38 (e.g., document database) can store the actual documents or content that the user desires to access. A web interface 34 can be configured to communicate with users and to allow access to documents in the knowledge repository. The web interface may also contain user session connection information. System security and user security levels can also be set up in the web interface.

One or more search engines 36 are located with or accessed through the web interface 34. The search engines and knowledge repository 38 work in cooperation with a document management module. The search engine indexes the documents and allows the user to perform a Boolean search query against the indexes. The search engine can also receive search requests from meta-search engines using an interface other than the web interface.

The document management module 40 and a data mart 42 include specific document management functions. The data mart 42 enables the system to track an amount of time each unique user has a document open to create a set of open time values for a document. The data mart can also track other document activity metrics as needed. The document management module aids in the formatting, upkeep, and publishing of electronic documents and content in the knowledge repository. Examples of document management modules are software products such as Documentum@ or Vignette@. The document notes, creator identity and document age can be stored in the document management module. In addition, the document management module can store a working copy of the documents and sync itself with the knowledge repository.

A document usefulness process 44 is located with the data mart 42. The document usefulness process is configured to determine document usefulness based on the comparison of the document open time values for the unique users. Specifically, an individual document open time value will be compared to the set of document open time values. In addition, a time value reference point for the set of document open time values can be used to indicate that a document is useful. The document usefulness process can select the time value reference point which indicates when the document is useful. As will be described later, the time value reference point can be the median of the set of document open time values. The median may be used because it is intolerant to outlying values. Other time value reference points can be used such as the average document open time or other statistical reference points.

Once the information regarding document usefulness has been collected, this information can be disseminated to end users. The distribution of information is performed through an external interface 46. The external interface can provide document usefulness to a user through a web site, email, instant messaging, and additional electronic communication channels. In addition, the user interface allows users to decide which documents should be translated into foreign languages, localized to specific regions, or retained in the database.

In the past, a knowledge repository system has not been able to capture information regarding document transactions and then process that data. This is because the search engine was independent of the document management module and data mart. Further, document usefulness has not been previously related to capturing of aggregate document transactions, usage and time open metrics. Providing this information allows the system to relate document activity to document usefulness.

Figure 4:
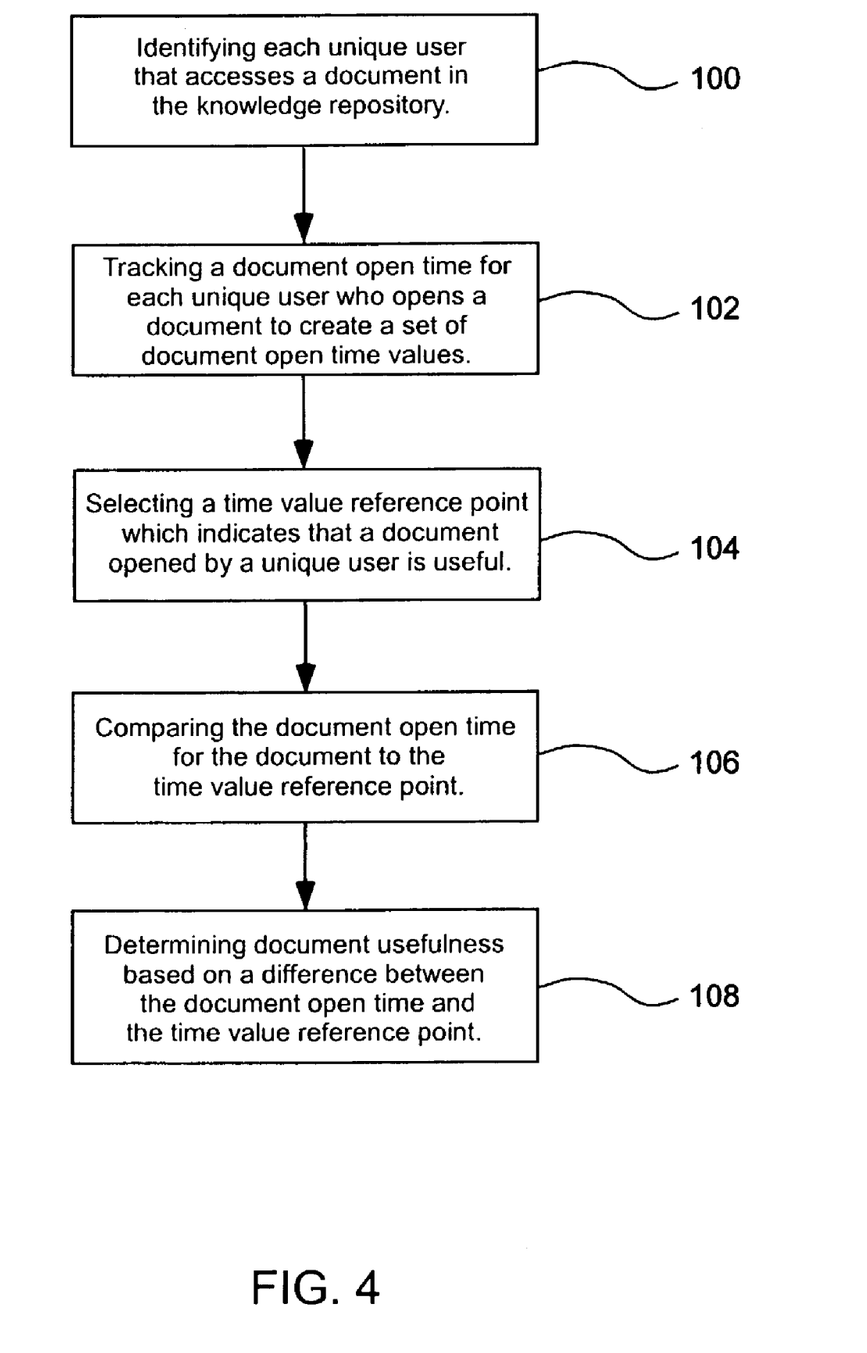
FIG. 4 is a flow chart illustrating an embodiment of a method for identifying useful documents in a knowledge repository using a time value reference point for a set of document open time values.

FIG. 4 illustrates an embodiment of the invention that includes a method for identifying useful content in a knowledge repository that is accessed by a plurality of users. This method uses a time value reference point or benchmark against which to gauge document open time values. The method includes a step of identifying each unique user that accesses the document in the knowledge repository in block 100. This can include tracking whether the same unique user repeatedly accesses the same document. Accordingly, the cumulative time that a unique user accesses a specific document can be recorded. In addition, repeated opening of a document may represent that the document is more useful because the user has accessed the document several times to answer a question or to refer to specific information.

Another step is tracking a document open time for each unique user who opens a document to create a set of document open time values in block 102. As discussed before, when the set of document time open values becomes relatively large then the usefulness calculations can be more accurate. A time value reference point is also selected which indicates that a document opened by a unique user is useful in block 104. The time value reference point can be the median of the set of document time values or other useful statistical values. The more detailed use of this time value reference point will be described later. A further step is comparing the document open time for the document to the time value reference point in block 106. This comparison helps determine the document usefulness based on a difference between the document time open value and the time value reference point in block 108.

In order for the system and method of the present invention to determine whether a substantial portion of a document has been read, the system must also determine what is defined as a reasonable amount of time that the document should remain open to infer that it has been substantially read.

The present system is able to provide a benchmark for this calculation by collecting data from each user or reader of the document. The collected data creates a set of document open time values. In other words, the set of document open time values can be a list of documents opened by unique users with the amount of time each document was opened by the unique user. A biased standard deviation (SD) of the times in the set of document time open values can be calculated as follows:

$$SD = \sqrt{\frac{\sum_{i}^{n}(t_i - T)^2}{n}} \quad \text{Equation 1}$$

Where:

SD is the standard deviation of the time durations that document D has been opened by all the unique users, $t_i$ is a time duration that the document D has been opened at time i, n is the number of times document D has been opened, and T is the average time document D has been opened. This standard deviation value reflects the dispersion of time open durations for a document.

An embodiment of the present invention computes the median time M that the document has been open. A valuable characteristic of the median is its insensitivity to extreme values. The present invention uses the median value as one indicator of a reasonable time that a document should be opened in order to convey some useful information to the reader. Of course, other statistical values can be used as a time reference point.

As the time duration that the document is open decreases from M then the present invention correlates that to a decrease in document usefulness. At the same time, if a document's time duration increases from M, the present system and method correlates that to be a decrease in document usefulness. When a document open time is closer to M, this indicates the document is more useful.

As discussed previously, several analytical reasons exist for this application of the document open values to the benchmark median. Specifically, short open times probably represent that a user was not interested in a document. In a similar manner, long open times probably mean that a user has left the document open while the user was not actually using the document.

Figure 5:
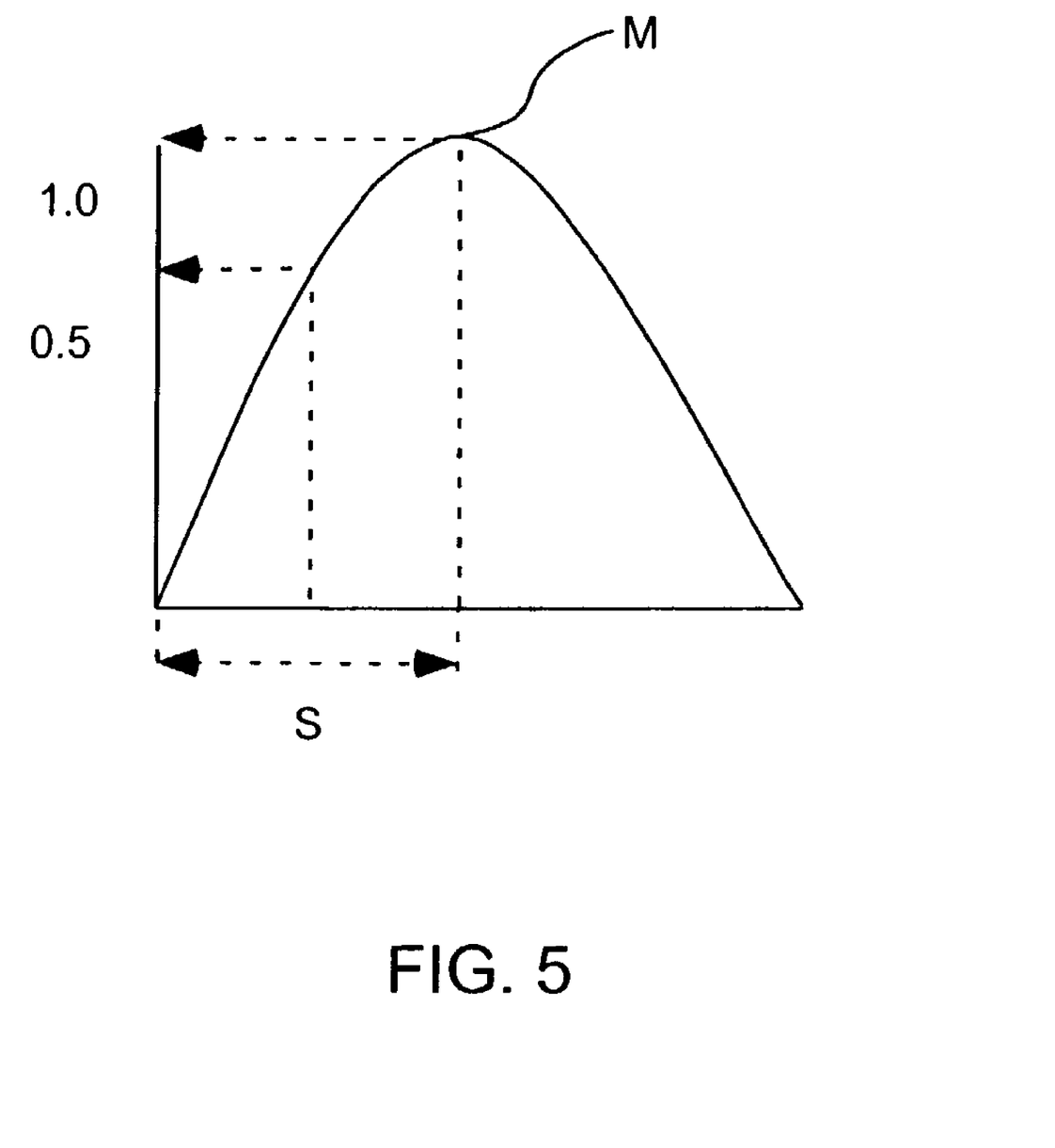
FIG. 5 is a bell shaped curve illustrating a median point and a standard deviation for the set of document open time values in an embodiment of the present invention.

FIG. 5 is a bell-shaped curve that illustrates a set of document open time values in a normal distribution. This function can be viewed as having at least two reference points. The first reference point is the value that is the time value reference point or benchmark value M. In one embodiment, the document usefulness process can use the median for a document as M. Other time value reference points can be used such as the average or a selected value. The second reference point is the half width of the curve S which is the standard deviation from M. Document open time values that fall within a standard deviation from M will be considered useful.

The document time open values will not necessarily be a normal distribution as illustrated and various value distributions may be produced. For example, the distribution may be flatter and wider, taller and narrower, or irregular. In these situations, the standard deviation can be at some other point than the half-width of the curve. Alternatively, intervals other than the half-width can be used for S to define a group of useful documents.

The usefulness $u_i$ of the document D, which has been opened at time i for the duration of t is calculated as:

$$u_i = \frac{1}{1 + \left(\frac{t_i - M(T)}{S}\right)^2} \quad \text{Equation 2}$$

This calculation of usefulness provides a decimal value between zero and one. As $u_i$ nears zero this indicates that the document is less useful. As $u_i$ comes closer to one the document is more useful (i.e. as it nears the median).

In the equation above, $u_i$ is the usefulness of document D opened for time duration $t_i$, $t_i$ is the time duration document D has been opened at time i, M(T) is the median time duration that document D has been opened or the median time value reference point, S is the standard deviation of the time duration that document D has been opened.

Each U value represents the total usefulness of a document to users, assuming that the document was opened a number of times. In other words, Equation 3 is used to calculate a weighted aggregation of the usefulness values $u_i$ using the fractional values generated by Equation 2:

$$U = \frac{1}{n-1} \sum_{i}^{n} u_i \times W_u \quad \text{Equation 3}$$

U is final usefulness of a document where n is the total number of times the document has been opened, $u_i$ is the usefulness of the document time at time i, and $W_u$ is the frequency weight of document U.

The frequency weight $W_u$ of document U is used to normalize the document comparison for all the documents in the database. The frequency weight $W_u$ is normalized by the number of times the most frequently opened document was accessed. The frequency weight is calculated as follows:

$$W_u = \frac{U_n}{\text{Max}_n} \quad \text{Equation 4}$$

Where:

Max$_n$ is the number of times that the most frequently used document was opened, and U$_n$ is the number of times document U was opened.

Using the method described above, the system can create a list showing the most useful documents and the aggregated degree of their usefulness. Documents that are on the bottom of the list are most likely to be out of the norm.

Being able to identify useful documents is also valuable to a topical expert or knowledge engineer. The list of useful documents can be inserted into a two-dimensional map based on topics. This shows a knowledge engineer which documents have been useful in a recent time period. For example, the knowledge engineer may desire to see which computer support topics have been used most recently in the last month. This allows the knowledge engineer to create further content in an active knowledge area and develop the knowledge repository in areas that are useful to the users, as opposed to areas deemed relevant by the engineer.

Another manner in which document usefulness can be applied is in prioritizing the updating and analysis of the document summaries. More useful documents can be analyzed before less useful documents to determine if their document summary or one line description better describes the content of the document. The time and energy used in creating abstracts and summaries can be applied to useful documents as opposed to documents which are not useful. The end result of this process is more focused abstracts which can steer users to documents containing relevant information for the user and away from less relevant documents. Further, the relevant documents will have a better abstract or short description because more time has been spent on them.

Localization is an additional area where document usefulness can be applied. When useful documents are identified, these documents can be presented as likely candidates to be translated into multiple languages or localized into regional formats. The present invention allows system administrators to more effectively select useful documents that can be converted for use in other countries. Applying document usefulness to localization also helps avoid the translation and localization of documents that are not useful.

In summary, the present system and method identifies more useful electronic content in a knowledge repository by analyzing the usage and interaction of users with an information retrieval system. Identifying useful information in a knowledge repository can be a valuable tool to knowledge management personnel and end users who view the information. The use of a system and method for determining document usefulness helps provides users with better access to highly rated information which can ultimately save a company money and increase customer satisfaction.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for identifying useful content in a knowledge repository accessed by a plurality of users, comprising the steps of:
   identifying each unique user that accesses a document in the knowledge repository;
   tracking an amount of time each unique user has a document open to create a set of document open time values; and
   determining document usefulness based on a comparison of the document open time values for the unique users.

2. A method as in claim 1, further comprising the step of determining document usefulness based on an individual document open time value as compared to the set of document open time values.

3. A method as in claim 1, further comprising the step of selecting a time value reference point from the set of document open time values to indicate that a document opened by a unique user is useful.

4. A method as in claim 3, further comprising the step of comparing the amount of time a document has been open to the time value reference point to determine that the document is useful.

5. A method as in claim 4, further comprising the step of determining that a document is useful if the document is within a standard deviation from the time value reference point.

6. A method as in claim 1, further comprising the step of determining the usefulness of a document using a time value reference point that is the median of the set of document open time values.

7. A method as in claim 1, further comprising the step of determining a document is more useful than other documents based on the document that was opened by the largest number of unique users for an amount of time that indicates the document was useful.

8. A method for identifying useful content in a knowledge repository accessed by a plurality of users, comprising the steps of:
   identifying each unique user that accesses a document in the knowledge repository;
   tracking a document open time for each unique user who opens a document to create a set of document open time values;
   selecting a time value reference point for the set of document open time values, which time value reference point indicates that a document opened by a unique user is useful;
   comparing the document open time for the document to the time value reference point; and
   determining document usefulness based on a difference between the document open time and the time value reference point.

9. A method as in claim 8, further comprising the step of determining that a document is useful if the document is within one standard deviation from the time value reference point.

10. A method as in claim 8, further comprising the step of determining the usefulness of a document using a time value reference point that is the median of the set of document open time values.

11. A method as in claim 10, further comprising the step of determining document usefulness using the following formula:

$$u_i = \frac{1}{1 + \left(\frac{t_i - M(T)}{S}\right)^2}$$

where:
$u_i$ is a usefulness indicator of document opened at time i;
t is a duration the document was open;
M(T) is a median time duration that the document has been open; and
S is a standard deviation of time duration that the document has been open.

12. A method as in claim 10, further comprising the step of determining the document usefulness when the document has been opened N number of time using the following formula:

$$U = \frac{1}{n-1} \sum_{i}^{n} u_i \times W_u$$

where:
U is the final usefulness indicator of a document;
N is the total number of times a document has been opened;
$U_i$ is the usefulness indicator of the document at time I; and
$W_u$ is the weight of document U.

13. A method for identifying useful content in a knowledge repository accessed by a plurality of users, comprising the steps of:
identifying each unique user that accesses a document in the knowledge repository;
tracking a document open time that each unique user has the document open to create a set of document open time values;
finding a median time value from the set of document open time values to indicate that a document opened by a unique user is useful; and
calculating a time difference between the open time and the median time value; and
determining document usefulness based on whether the document time difference is within a standard deviation from the median time value.

14. A method for identifying useful content in a knowledge repository accessed by a plurality of users, comprising the steps of:
identifying each unique user that accesses a document in the knowledge repository;
tracking an amount of time each unique user has the document open to create a set of document open time values; and
determining document usefulness based on whether a substantial portion of the document was read by the user as indicated by the amount of time each unique user has the document open.

15. The method as in claim 14, wherein the step of determining document usefulness based on whether a substantial portion of a document was read, further comprises the step of tracking the maximum and minimum document open time values.

16. The method as in claim 14, further comprising the step of determining that a document is more useful because it is ranked as more useful by users in search ratings as compared to other documents in the knowledge repository.

17. The method as in claim 14, further comprising the step of determining that a document is more useful because it is ranked as more useful by users in search ratings for a specific search topic as compared to other documents in the knowledge repository.

18. The method as in claim 14, further comprising the step of determining that a document is more useful because a large number of unique users have opened the document as compared to other documents in the knowledge repository.

19. The method as in claim 14, further comprising the step of using user feedback received from users' and document open times to determine whether a document is relevant.

20. A system for identifying useful content accessed by a plurality of users, comprising:
a knowledge repository configured to contain documents which can be accessed by the plurality of users;
a web interface configured to communicate with users and identify each unique user that accesses a document in the knowledge repository;
a document management module configured to track an amount of time each unique user has a document open to create a set of document open time values; and
a document usefulness process configured to determine document usefulness based on a comparison of the document open time values for the unique users.

21. A system as in claim 20, wherein the document usefulness process determines document usefulness based on an individual document open time value as compared to the set of document open time values.

22. A system as in claim 20, wherein the document usefulness process is configured to select a time value reference point for the set of document open time values to indicate that a document opened by a unique user is useful.

23. A system as in claim 22, wherein the time value reference point is the median of the set of document open time values.

24. A system for identifying useful content accessed by a plurality of users, comprising:
a knowledge repository means for storing documents to be accessed by the plurality of users;
an interface means for communicating with users and identifying each unique user that accesses a document in the knowledge repository;
a management means for tracking an amount of time each unique user has a document open to create document open time values; and
a usefulness means for determining document usefulness based on an individual document open time value as compared to the document open time values for the unique users.

* * * * *